June 26, 1923.  
A. A. SMITH ET AL  
CLUTCH  
Filed March 20, 1922  
1,460,217  
2 Sheets-Sheet 1
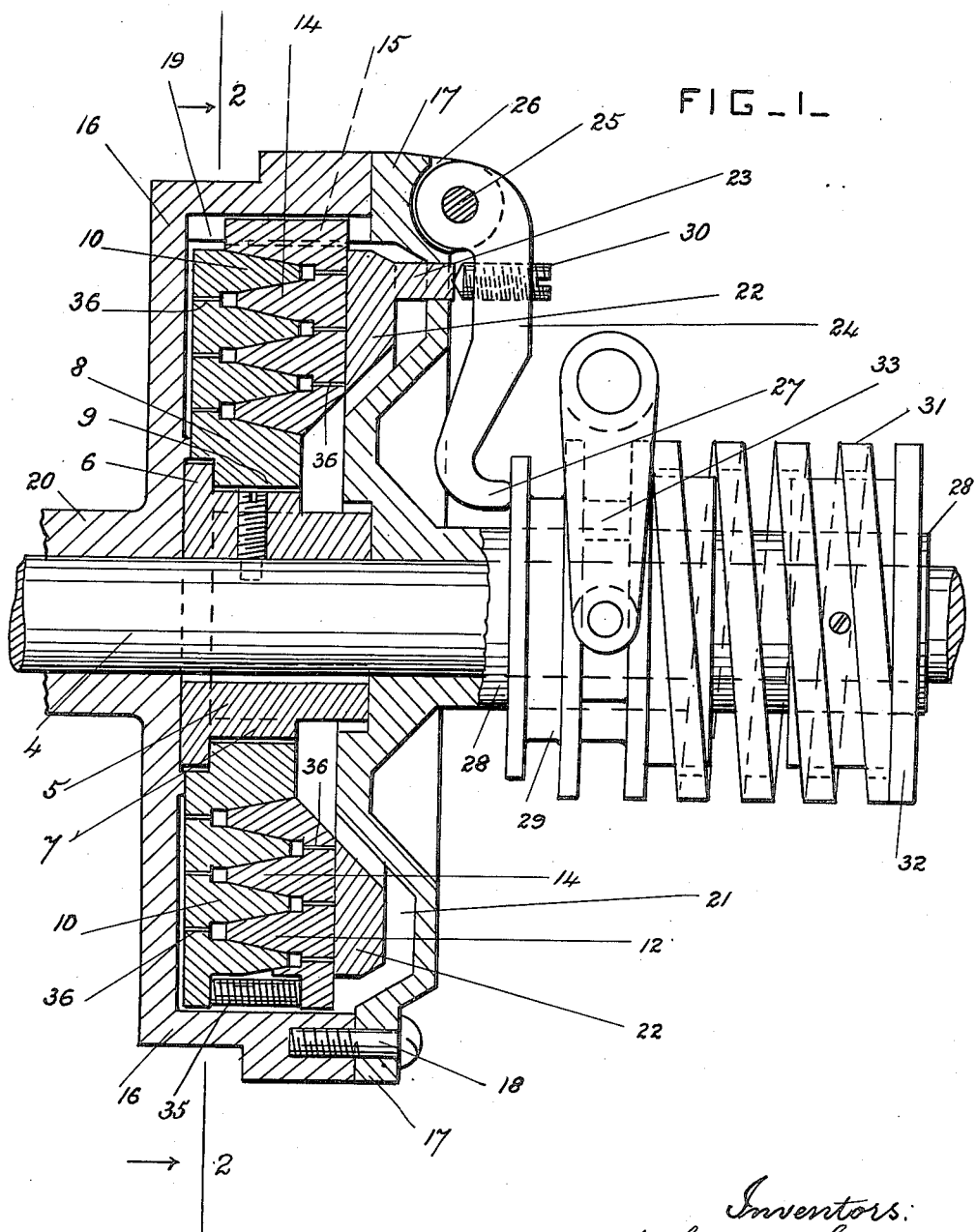
FIG_1_
Inventors:  
Arthur A. Smith,  
and Robert E. Smith  
by Herbert W. T. Jenner,  
Attorney.

June 26, 1923.  A. A. SMITH ET AL  1,460,217
CLUTCH
Filed March 20, 1922   2 Sheets-Sheet 2
FIG_2_
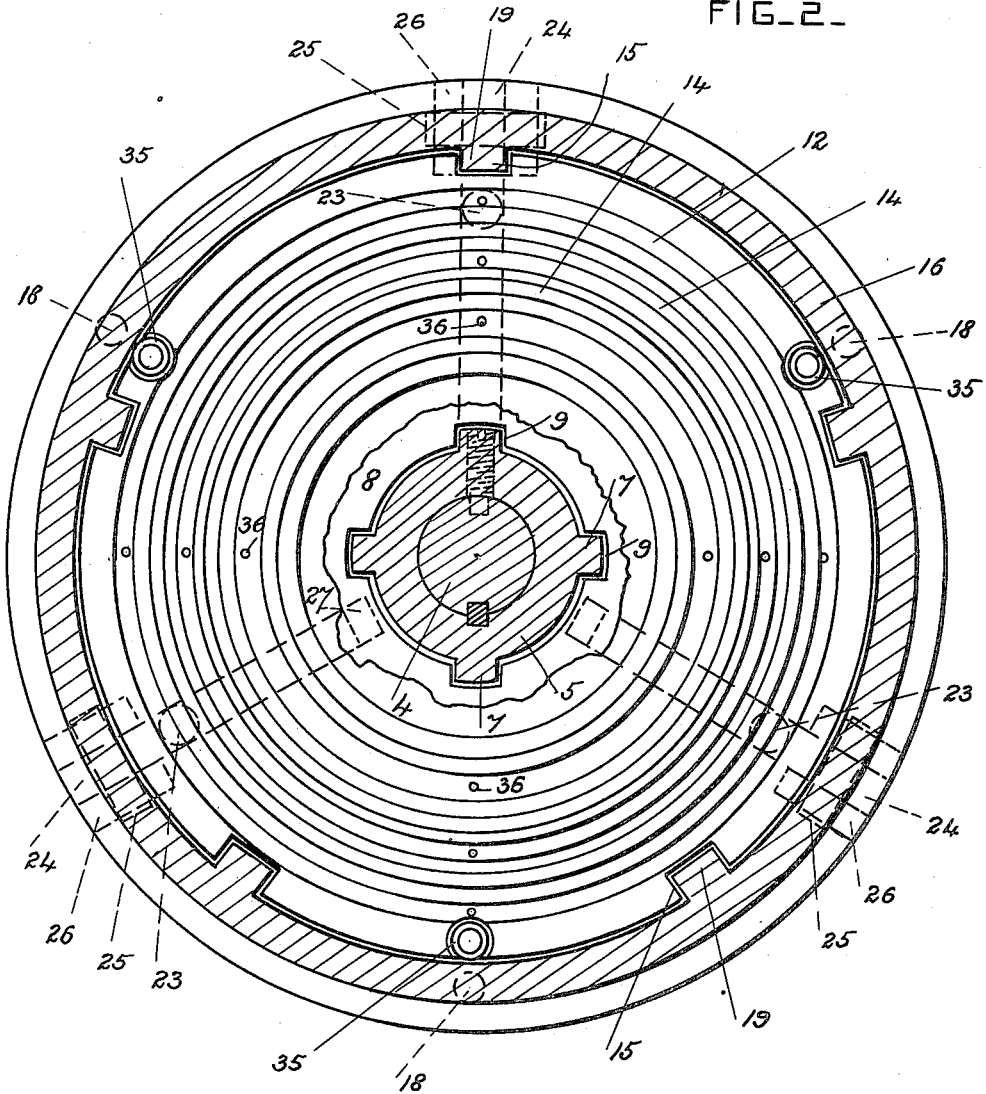

Patented June 26, 1923.

1,460,217

UNITED STATES PATENT OFFICE.

ARTHUR A. SMITH, OF LEWIS, AND ROBERT E. SMITH, OF KINSLEY, KANSAS.

CLUTCH.

Application filed March 20, 1922. Serial No. 545,084.

*To all whom it may concern:*

Be it known that we, ARTHUR A. SMITH and ROBERT E. SMITH, citizens of the United States, residing at Lewis and at Kinsley, respectively, in the county of Edwards and State of Kansas, have invented certain new and useful Improvements in Clutches, of which the following is a specification.

This invention relates to friction clutches specially adapted for use on motor cars, but which may be used wherever desirable; and it consists in the novel construction and combination of the parts hereinafter fully described and claimed.

In the drawings, Figure 1 is a longitudinal section through a clutch constructed according to this invention. Fig. 2 is a cross-section, taken on the line 2—2 in Fig. 1, through the casing.

The driving shaft 4 is revolved by any approved means or motor. A driving sleeve 5 is rigidly secured on the shaft 4, and has a flange 6 at one end, and a series of radial projections 7 at its periphery. The projections 7 are spaced at equal distances apart, and are arranged parallel to the shaft 4 and to each other. A driving clutch member 8 is mounted loosely on the sleeve 5, and is prevented from sliding too much in one direction by the flange 6. The clutch member 8 has a series of grooves 9 in its hub portion which engage loosely with the projections 7 so that the clutch member 8 is revolved by the driving shaft but is free to tilt to a limited extent in all directions. The driving clutch member 8 is free to slide radially of the driving shaft on the driving sleeve 5, and also axially away from the flange 6 or other similar abutment, so that it may tilt or rock on the sleeve. The clutch member 8 has also a series of rings or corrugations 10 on one face, which are triangular in cross-section.

A driven clutch member 12 is provided, and has a series of rings or corrugations 14 on one side face, which are also triangular in cross-section, and which engage with the rings or corrugations 10 so that one clutch member may drive the other by frictional engagement. The driven clutch member 12 has also a series of grooves 15 at its periphery.

The two clutch members are inclosed in an oil-tight casing formed of two parts 16 and 17 secured together by bolts 18. The part 16 of the casing has at its periphery a series of internal projections 19 which engage loosely and slidably with the grooves 15, and which permit the clutch member 12 to be slid into and out of engagement with the driving clutch member 8. The driven clutch member 12 is also free to slide radially of the axis of the driving shaft and the casing so that it may tilt or rock in a similar manner to the driving clutch member 8. The part 16 has also a sleeve 20 which is journaled on the driving shaft, and which is operatively connected with the mechanism to be driven, by any approved means.

The other part 17 of the casing has an annular chamber 21 behind the driven clutch member 12, and a push ring 22 is mounted in this chamber, and is provided with studs 23 which project laterally through holes in the part 17 of the casing, and are arranged parallel to the driving shaft.

Arms 24 are pivoted by pins 25 to lugs 26 on the outside of the part 17, and are arranged radially of the driving shaft. Three arms are preferably provided, and their free end portions 27 are curved outwardly away from the casing. The part 17 of the casing has also a sleeve 28 which is journaled loosely on the driving shaft 4, and 29 is a collar slidable longitudinally on the sleeve and bearing against the end portions 27 of the three arms. These arms 24 have screws 30 which bear on the studs 23, and adjust the pressure on them. The collar is pressed towards the arms by a spring 31 which encircles and engages with one end portion of the collar 29, and bears against an abutment 32. A lever 33 is provided for controlling the collar 29, and for holding it out of engagement with the arms.

The casing is prevented from sliding longitudinally by contact with the ends of the driving sleeve 5. When the clutch members are pressed into driving engagement with each other by the spring 31, the driving clutch member 8 bears against the flange 6 on the driving sleeve 5, or against the part 16 of the casing.

Clutch releasing springs 35 are arranged between the driven clutch member 12 and the driving clutch member. These springs 35 are preferably helical springs, and are arranged at equal distances apart and adjacent to the periphery of the casing, and three springs are preferably provided.

The casing is preferably filled with a heavy oil, and small oil holes 36 are provided in the clutch members at the bottoms of their rings or corrugations. The passage of the oil through these holes ensures the gradual engagement of the clutch members, which is desirable when the device is used on a motor car. The loose engagement of the clutch members with the driving sleeve 5 and with the part 16 of the casing ensures a satisfactory frictional engagement between the corrugated faces of the clutch members, each face being automatically adjustable to the other.

What we claim is:

1. A friction clutch, comprising a revoluble driving shaft, a driving sleeve secured on the driving shaft, a driving clutch member revolving with the said sleeve and free to slide axially and radially thereon, a non-slidable abutment which prevents the driving clutch member from sliding axially in one direction, a driven clutch member adapted to engage with the driving clutch member and free to slide radially with it, a non-slidable casing inclosing the clutch members and revolving with the driven clutch member, and means for sliding the driven clutch member into and out of engagement with the driving clutch member.

2. A friction clutch, comprising a revoluble driving shaft, a driving sleeve secured on the driving shaft, a driving clutch member revolving with the said sleeve and free to slide axially and radially thereon, a non-slidable abutment which prevents the driving clutch member from sliding axially in one direction, a driven clutch member adapted to engage with the driving clutch member and free to slide radially with it, a non-slidable casing inclosing the clutch members and revolving with the driven clutch member, a spring which normally holds the clutch members in driving engagement, and means for separating the two clutch members when the driven clutch member is retracted.

3. A friction clutch, comprising a revoluble driving shaft, a driving sleeve secured on the driving shaft, a driving clutch member revolving with the said sleeve and free to slide axially and radially thereon and provided with a series of corrugations, a non-slidable abutment for the driving clutch member, a driven clutch member provided with a series of corrugations for engaging with the corrugations of the driving clutch member, said driven clutch member being free to slide radially with the driving clutch member, a non-slidable casing inclosing the clutch members and revolving with the driven clutch member, and means for sliding the driven clutch member into and out of engagement with the driving clutch member.

4. A friction clutch, comprising a revoluble driving shaft, a driving clutch member revolving therewith, an abutment which prevents the driving clutch member from sliding axially in one direction, a slidable driven clutch member, a non-slidable casing inclosing the clutch members and revolving with the driven clutch member, a push ring arranged against the driven clutch member and having studs which project through holes in one side of the casing, radial arms pivoted to the casing and engaging with the said studs, and a retractible spring-pressed sleeve which normally presses the arms against the studs to hold the two clutch members in driving engagement.

5. A friction clutch, comprising a revoluble driving shaft, a non-slidable driving clutch member revolving therewith, a slidable driven clutch member adapted to engage with the driving clutch member, a non-slidable casing inclosing the said clutch members and revolving with the driven clutch member, said casing having an annular chamber, a push ring arranged in the said annular chamber and provided with studs which project through holes in the side of the casing, radial arms pivoted at one end to the casing and engaging with the said studs, means for pressing the arms against the studs simultaneously to place the clutch members in driving engagement, and means for separating the clutch members automatically when the said arms are released.

In testimony whereof we affix our signatures.

ARTHUR A. SMITH.
ROBERT E. SMITH.